(12) United States Patent
Inoue et al.

(10) Patent No.: US 11,847,592 B2
(45) Date of Patent: Dec. 19, 2023

(54) REQUIRED TIME PREDICTION APPARATUS, CONTROL METHOD, AND NON-TRANSITORY STORAGE MEDIUM

(71) Applicant: NEC Corporation, Tokyo (JP)

(72) Inventors: Hirofumi Inoue, Tokyo (JP); Shin Tominaga, Tokyo (JP); Shigeki Shinoda, Tokyo (JP); Yuzo Senda, Tokyo (JP); Shigeru Sekine, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/792,025

(22) PCT Filed: Jan. 22, 2020

(86) PCT No.: PCT/JP2020/002164
§ 371 (c)(1),
(2) Date: Jul. 11, 2022

(87) PCT Pub. No.: WO2021/149199
PCT Pub. Date: Jul. 29, 2021

(65) Prior Publication Data
US 2023/0046797 A1 Feb. 16, 2023

(51) Int. Cl.
*G06Q 10/04* (2023.01)
*G06Q 50/30* (2012.01)
(52) U.S. Cl.
CPC ............. *G06Q 10/04* (2013.01); *G06Q 50/30* (2013.01)
(58) Field of Classification Search
CPC ................................ G06Q 10/04; G06Q 50/30
(Continued)

(56) References Cited

U.S. PATENT DOCUMENTS

2011/0178701 A1 7/2011 Gupta et al.
2013/0261956 A1 10/2013 Marks
(Continued)

FOREIGN PATENT DOCUMENTS

JP 2002-296071 A 10/2002
JP 2013-517513 A 5/2013
(Continued)

OTHER PUBLICATIONS

"Measuring Quality of Service in Airport Passenger Terminals" Published by Sage Journals (Year: 2011).*
(Continued)

*Primary Examiner* — Zeina Elchanti
(74) *Attorney, Agent, or Firm* — Sughrue Mion, PLLC (57) ABSTRACT

A required time prediction apparatus (2000) acquires utilization facility information and assumed date and time information. The utilization facility information is information enabling to determine a departure facility and a destination facility. The assumed date and time information is information enabling to determine an assumed departure date and time assuming departure from the departure facility or an assumed arrival date and time assuming arrival at the destination facility. The apparatus (2000) estimates a waiting time at each facility being present between the departure facility and the destination facility, regarding a case of assuming departure from the departure facility at the assumed departure date and time, or a case of assuming arrival at the destination facility at the assumed arrival date and time. Then, the apparatus (2000) computes, based on the estimated waiting time, a predicted required time from departure from the departure facility to arrival at the destination facility.

11 Claims, 6 Drawing Sheets

(58) Field of Classification Search
USPC .......................................................... 705/13
See application file for complete search history.

(56) References Cited

U.S. PATENT DOCUMENTS

2013/0297551 A1* 11/2013 Smith .................. H04L 51/222
                                                         706/48
2018/0039679 A1*  2/2018 Endres ............... G06Q 30/0283

FOREIGN PATENT DOCUMENTS

| JP | 2014-174094 A | 9/2014 |
| JP | 2019-082450 A | 5/2019 |
| JP | 2019-144167 A | 8/2019 |
| JP | 2019-144168 A | 8/2019 |
| WO | 2019/163412 A1 | 8/2019 |

OTHER PUBLICATIONS

International Search Report for PCT Application No. PCT/JP2020/002164, dated Mar. 10, 2020.
Extended European Search Report for EP Application No. 20915184.4, dated Dec. 15, 2022.

* cited by examiner

REQUIRED TIME PREDICTION APPARATUS, CONTROL METHOD, AND NON-TRANSITORY STORAGE MEDIUM

This application is a National Stage Entry of PCT/JP2020/002164 filed on Jan. 22, 2020, the contents of all of which are incorporated herein by reference, in their entirety.

TECHNICAL FIELD

The present invention relates to prediction of a required time.

BACKGROUND ART

In order to get on a plane at an airport, it is necessary to pass through various facilities such as a check-in counter and a security check point. In order to efficiently utilize an airport, it is preferable that a time required for passing through the facilities and reaching a desired place (e.g., a boarding gate) can be recognized.

Patent Document 1 discloses a technique for computing a required time from a terminal entrance to a boarding gate, from a time required for traveling between facilities and a time required for passage through each facility, regarding a case of passing through a check-in counter, a security check point, and an automated gate between the terminal entrance and the boarding gate. A time required for passage through a facility is predicted based on a current congestion state of the facility.

RELATED DOCUMENT

PATENT DOCUMENT

[Patent Document 1] Japanese Patent Application Publication No. 2019-082450

SUMMARY OF THE INVENTION

TECHNICAL PROBLEM

In Patent Document 1, a time required for passage through a facility is computed based on a current congestion state. Thus, by the invention of Patent Document 1, it is impossible to recognize a required time regarding a case where a time of departing from a terminal entrance is different from (e.g., one hour after) a current time.

The present invention has been made in view of the problem described above, and one object thereof is to provide a technique enabling to flexibly recognize a required time for passing through one or more facilities at an airport and arriving at a desired place.

SOLUTION TO PROBLEM

A required time prediction apparatus according to the present invention includes: 1) an acquisition unit that acquires utilization facility information enabling to determine a departure facility in or near an airport and a destination facility in the airport, and assumed date and time information enabling to determine an assumed departure date and time assuming departure from the departure facility or an assumed arrival date and time assuming arrival at the destination facility; and 2) a computation unit that estimates a waiting time at each facility being present between the departure facility and the destination facility, regarding a case of assuming departure from the departure facility at the assumed departure date and time, or a case of assuming arrival at the destination facility at the assumed arrival date and time, and computes, based on the estimated waiting time, a predicted required time from departure from the departure facility to arrival at the destination facility.

A control method according to the present invention includes: 1) an acquisition step of acquiring utilization facility information enabling to determine a departure facility in or near an airport and a destination facility in the airport, and assumed date and time information enabling to determine an assumed departure date and time assuming departure from the departure facility or an assumed arrival date and time assuming arrival at the destination facility; and 2) a computation step of estimating a waiting time at each facility being present between the departure facility and the destination facility, regarding a case of assuming departure from the departure facility at the assumed departure date and time, or a case of assuming arrival at the destination facility at the assumed arrival date and time, and computing, based on the estimated waiting time, a predicted required time from departure from the departure facility to arrival at the destination facility.

A program according to the present invention causes a computer to execute a control method according to the present invention.

ADVANTAGEOUS EFFECTS OF INVENTION

The present invention provides a technique enabling to flexibly recognize a required time for passing through one or more facilities at an airport and arriving at a desired place.

DESCRIPTION OF EMBODIMENTS

Hereinafter, an example embodiment of the present invention is described by use of the drawings. Note that, a similar reference sign is assigned to a similar component in all the drawings, and description thereof is omitted accordingly. Moreover, unless otherwise specially described, each block indicates, in each block diagram, not a configuration on a hardware basis but a configuration on a function basis. In the following description, unless otherwise specially described, various predetermined values (threshold values and the like) are previously stored in a storage apparatus being accessible from a functional configuration unit utilizing the value.

[Example Embodiment 1]

<Outline>

Figure 1:
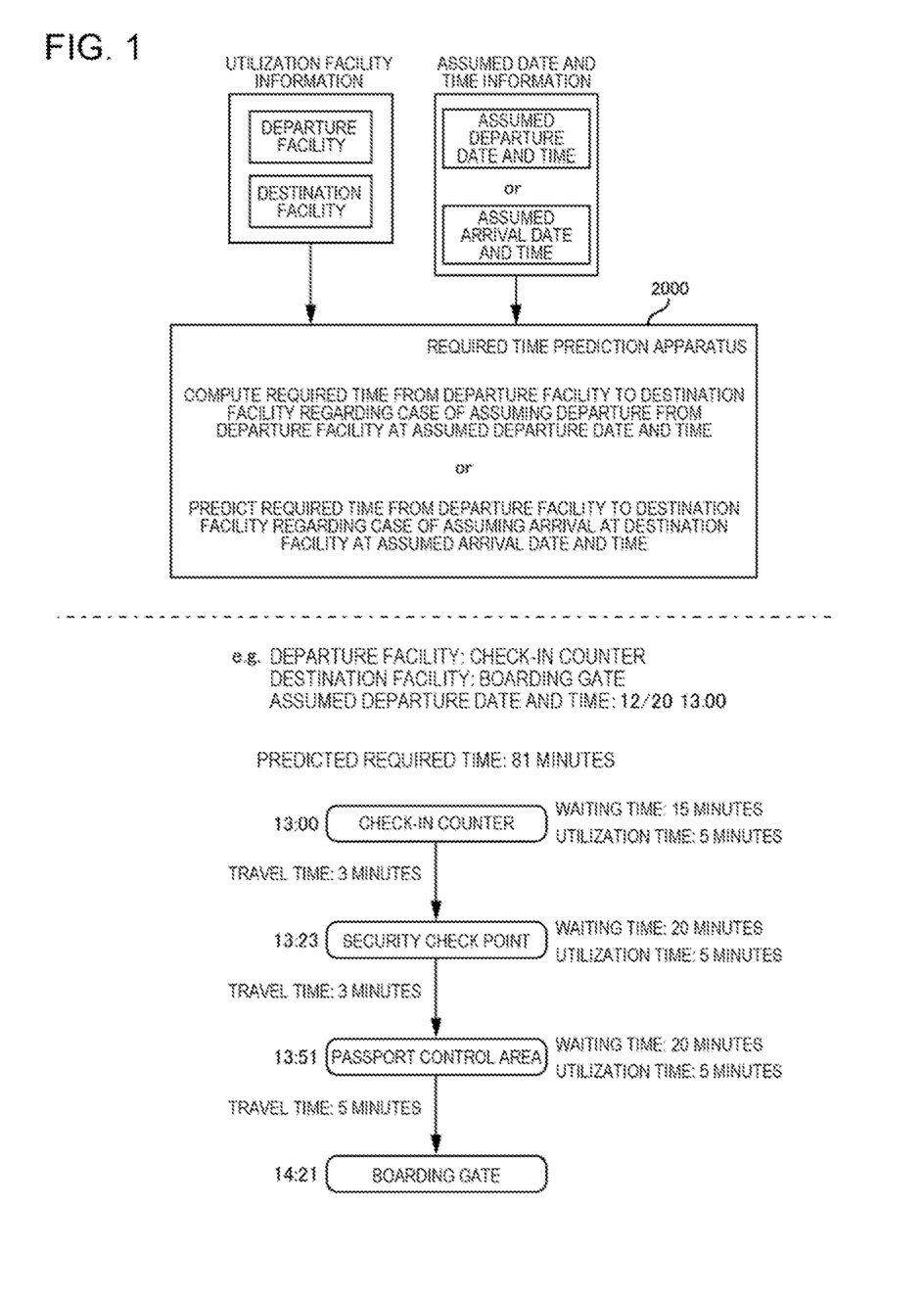
FIG. 1 is a diagram conceptually illustrating an operation of a required time prediction apparatus according to an example embodiment 1.

FIG. 1 is a diagram conceptually illustrating an operation of a required time prediction apparatus 2000 according to an example embodiment 1. Herein, the operation of the required time prediction apparatus 2000 described by use of FIG. 1 is an exemplification for easing understanding of the required time prediction apparatus 2000, and does not limit the operation of the required time prediction apparatus 2000. Details and a variation of the operation of the required time prediction apparatus 2000 are described later.

The required time prediction apparatus 2000 predicts a required time from departure from a departure facility to arrival at a destination facility (hereinafter, also referred to as a required time from a departure facility to a destination facility). The departure facility is a facility near an airport (hereinafter, utilization airport) utilized by a user of the required time prediction apparatus 2000 or in the utilization airport, and the destination facility is a facility in the utilization airport. When the departure facility is a facility near the utilization airport, the departure facility is, for example, a nearest railroad station or bus stop to the utilization airport (hereinafter, a nearest station to the utilization airport). When the departure facility is a facility in the utilization airport, the departure facility is a departure lobby, a check-in counter, a security check point, or the like.

The destination facility is a facility utilized by a user later than the departure facility. For example, it is assumed that, in the utilization airport, facilities are utilized in an order "a nearest station to the utilization airport, a departure lobby, a check-in counter, a security check point, a passport control area, and a boarding gate". In this case, for example, when the departure facility is a check-in counter, the departure facility is one of a security check point, a passport control area, and a boarding gate.

A required time from departure from a departure facility to arrival at a destination facility includes a time required for traveling from the departure facility to the destination facility, a utilization time of each of facilities included between the departure facility and the destination facility, and a waiting time for utilizing each facility. Among the times, at least a waiting time for a facility is changeable depending on a congestion degree of the facility. Then, the congestion degree of the facility is changeable depending on a timing of utilizing the facility.

Accordingly, the required time prediction apparatus 2000 acquires facility specification information enabling to determine a departure facility and a destination facility, and date and time specification information enabling to determine an assumed departure date and time or an assumed arrival date and time. The assumed departure date and time is a date and time assuming departure from a departure facility at the date and time. The assumed arrival date and time is a date and time assuming arrival at a destination facility at the date and time. Hereinafter, the assumed departure date and time and the assumed arrival date and time are also collectively referred to as an assumed date and time. The required time prediction apparatus 2000 computes a predicted required time from the departure facility to the destination facility by use of these pieces of information. The required time prediction apparatus 2000 estimates a waiting time of each facility included between the departure facility and the destination facility, based on an assumed departure date and time or assumed arrival date and time determined by date and time specification information. Then, the required time prediction apparatus 2000 computes a predicted required time from the departure facility to the destination facility, based on the estimated waiting time.

<One Example of Advantageous Effect>

The required time prediction apparatus 2000 according to the present example embodiment computes a predicted required time from a departure facility to an arrival facility, regarding a case of assuming departure from the departure facility at an assumed departure date and time, or a case of assuming arrival at a destination facility at an assumed arrival time, after considering a waiting time of each facility according to the date and time. Thus, a predicted required time from a departure facility to an arrival facility can be flexibly recognized, without being limited to a case of departure from the departure facility at a current time. In consequence, for a user, there is such an advantage that a schedule when utilizing an airport is allowed to be flexibly set. For example, a user can previously recognize, by utilizing the required time prediction apparatus 2000, such a matter as a time to arrive at a utilization airport, or how much time a store, a restaurant, or the like in the utilization airport can be utilized before check-in.

The required time prediction apparatus 2000 is described below in more detail.

<Example of functional configuration>

Figure 2:
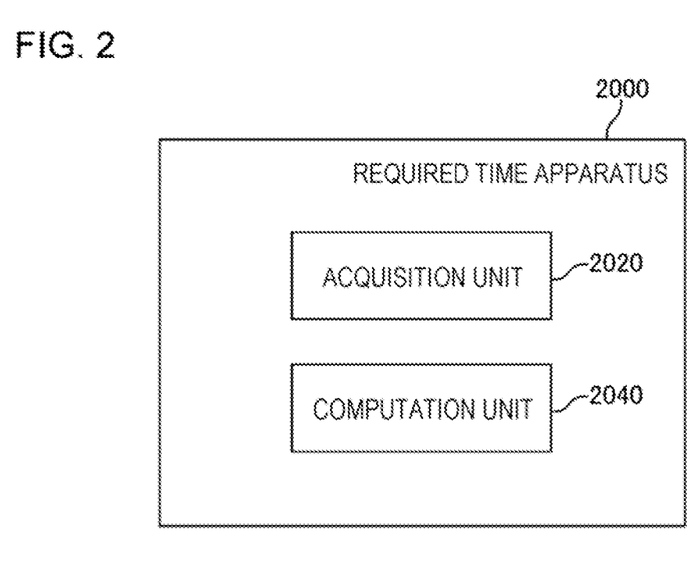
FIG. 2 is a block diagram illustrating a functional configuration of the required time prediction apparatus.

FIG. 2 is a block diagram illustrating a functional configuration of the required time prediction apparatus 2000. An acquisition unit 2020 acquires facility specification information and date and time specification information. The facility specification information is information enabling to determine a departure facility and a destination facility. The date and time specification information is information enabling to determine an assumed departure date and time or an assumed arrival date and time.

A computation unit 2040 estimates, based on the assumed departure date and time or the assumed arrival date and time, a waiting time of each facility being present between the departure facility and the destination facility, and computes, based on the estimated waiting time, a predicted required time from the departure facility to the destination facility.

<Example of Hardware Configuration of Required Time Prediction Apparatus 2000>

Each functional configuration unit of the required time prediction apparatus 2000 may be achieved by hardware (example: a hard-wired electronic circuit, or the like) that achieves each functional configuration unit, or may be achieved by a combination of hardware and software (example: a combination of an electronic circuit and a program controlling the electronic circuit, or the like). A case where each functional configuration unit of the required time prediction apparatus 2000 is achieved by a combination of hardware and software is further described below.

Figure 3:
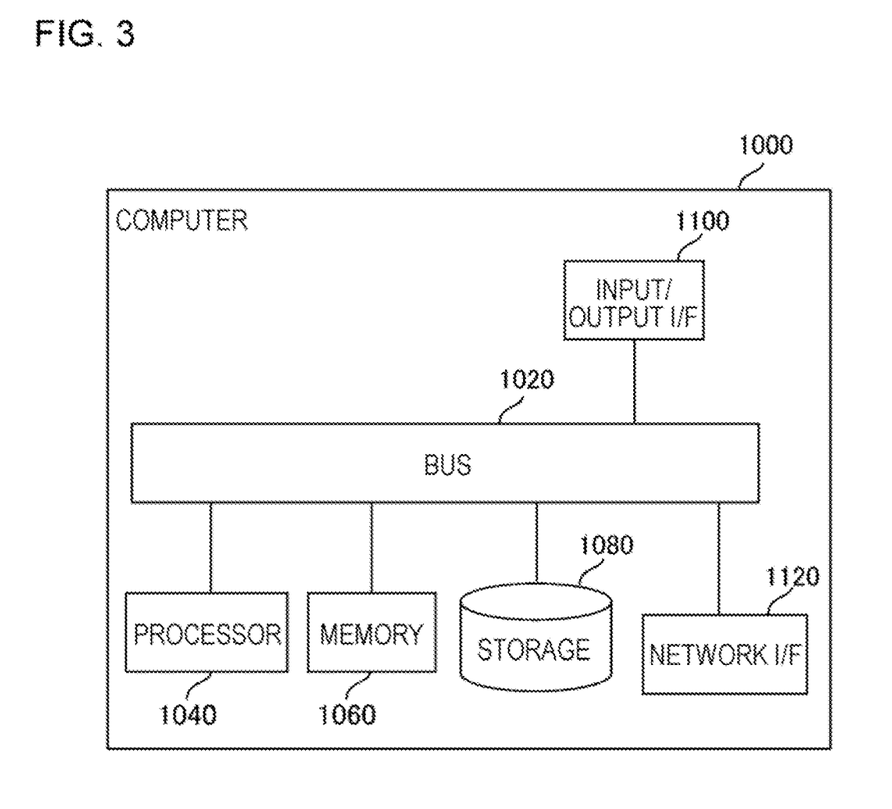
FIG. 3 is a diagram illustrating a computer for achieving the required time prediction apparatus.

FIG. 3 is a diagram illustrating a computer 1000 for achieving the required time prediction apparatus 2000. The computer 1000 is arbitrary computer. For example, the computer 1000 is a stationary computer such as a personal computer (PC) or a server machine. In another example, the computer 1000 is a portable computer such as a smartphone or a tablet terminal.

The computer 1000 may be a dedicated computer designed to achieve the required time prediction apparatus 2000, or may be a general-purpose computer. In the latter case, each function of the required time prediction apparatus 2000 is achieved in the computer 1000, for example, by installing a predetermined application on the computer 1000. The above-described application is configured by a program for achieving a functional configuration unit of the required time prediction apparatus 2000.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input/output interface 1100, and the network interface 1120 transmit/receive data to/from one another. However, a method of mutually connecting the processor 1040 and the like is not limited to bus connection.

The processor 1040 is various processors such as a central processing unit (CPU), a graphics processing unit (GPU), and a field-programmable gate array (FPGA). The memory 1060 is a main storage apparatus achieved by use of a random access memory (RAM) or the like. The storage device 1080 is an auxiliary storage apparatus achieved by use of a hard disk, a solid state drive (SSD), a memory card, a read only memory (ROM), or the like.

The input/output interface 1100 is an interface for connecting the computer 1000 and an input/output device with each other. For example, an input apparatus such as a keyboard and an output apparatus such as a display apparatus are connected to the input/output interface 1100.

The network interface 1120 is an interface for connecting the computer 1000 to a communication network. The communication network is, for example, a local area network (LAN) or a wide area network (WAN).

The storage device 1080 stores a program that achieves each functional configuration unit of the required time prediction apparatus 2000 (the above-described program that achieves the application). The processor 1040 reads each of the programs onto the memory 1060, executes the read program, and thereby achieves each functional configuration unit of the required time prediction apparatus 2000.

<Flow of Processing>

Figure 4:
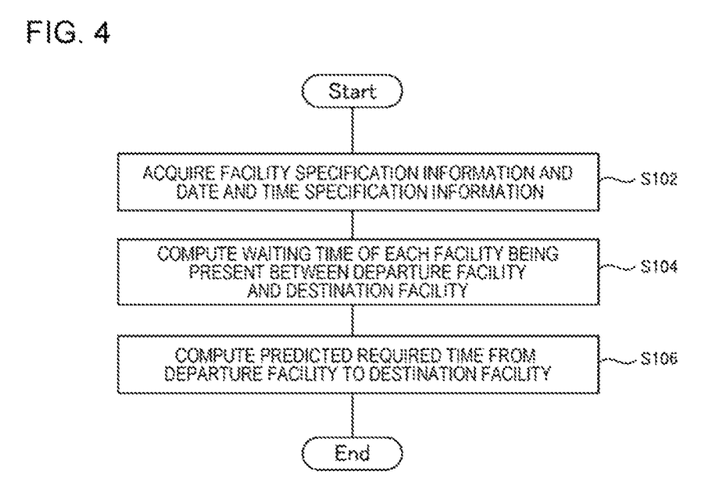
FIG. 4 is a flowchart illustrating a flow of processing executed by the required time prediction apparatus according to the example embodiment 1.

FIG. 4 is a flowchart illustrating a flow of processing executed by the required time prediction apparatus 2000 according to the example embodiment 1. The acquisition unit 2020 acquires facility specification information and date and time specification information (S102). The computation unit 2040 computes a waiting time of each facility being present between the departure facility and the destination facility, based on the facility specification information and the date and time specification information (S104). The computation unit 2040 computes a predicted required time from the departure facility to the destination facility (S106).

<Acquisition of Facility Specification Information and Date and Time Specification Information: S102>

The acquisition unit 2020 acquires facility specification information and date and time specification information (S102). For example, the required time prediction apparatus 2000 provides a user with an input screen prompting input of a departure facility, a destination facility, and a date and time. The acquisition unit 2020 acquires, as facility specification information and date and time specification information, a result of input preformed on the input screen by a user.

Figure 5:
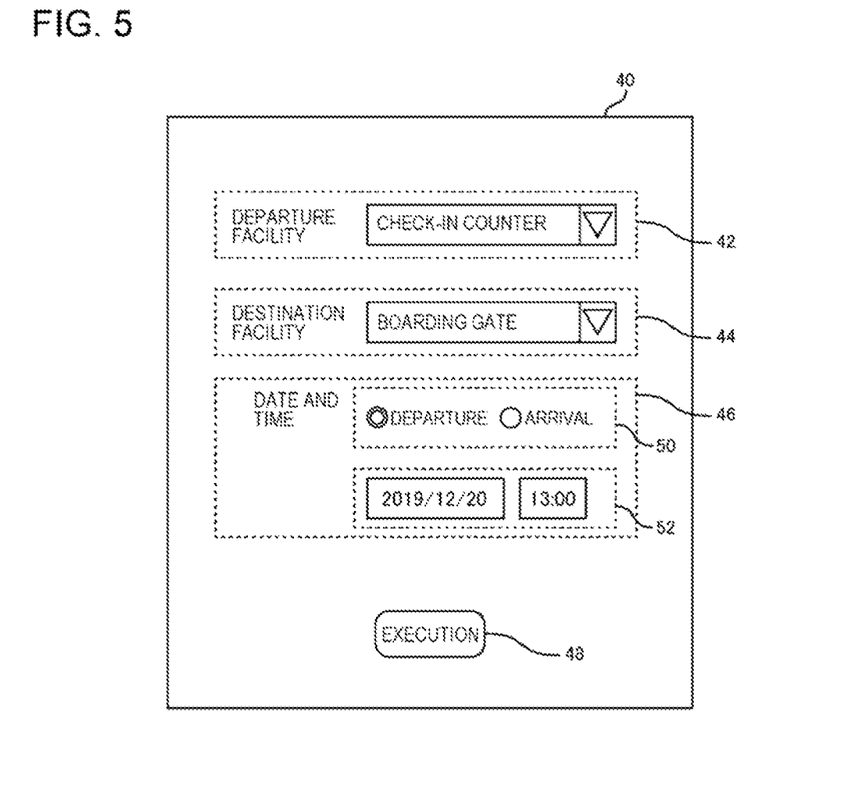
FIG. 5 is a diagram illustrating an input screen.

FIG. 5 is a diagram illustrating an input screen. An input screen 40 includes an input area 42, an input area 44, an input area 46, and an execution button 48. The input area 42 is an interface for selecting a facility to be handled as a departure facility. The input area 44 is an interface for selecting a facility to be handled as a destination facility. For example, in FIG. 5, a departure lobby is selected as a departure facility, and a boarding gate is selected as a destination facility. Information defining facilities selectable as a departure facility and facilities selectable as a destination facility is previously stored in a storage apparatus being accessible from the required time prediction apparatus 2000.

The input area 46 is an interface for specifying an assumed departure date and time or an assumed arrival date and time. The input area 46 is constituted of an input area 50 for selecting one of departure and arrival, and an input area 52 for specifying a date and time.

When departure is selected in the input area 50, a date and time input to the input area 52 indicates an assumed departure date and time. On the other hand, when arrival is selected in the input area 50, a date and time input to the input area 52 indicates an assumed arrival date and time. Note that, when only a time is input in the input area 52, it is preferred to handle the time as specification of the same date and time as a current time. Moreover, a current time may be automatically input to the input area 52 in response to selection of departure in the input area 50.

Note that, a plurality of assumed departure dates and times or assumed arrival dates and times may be allowed to be specified in the input area 46. In this case, the required time prediction apparatus 2000 computes a predicted required time regarding each of a plurality of specified assumed dates and times, and provides the predicted required time to a user. This allows a user to easily compare predicted required times regarding a plurality of specified assumed dates and times.

When the execution button 48 is pressed, facility specification information indicating a specified departure facility and destination facility, and date and time specification information indicating a specified assumed departure date and time or assumed arrival date and time are provided to the required time prediction apparatus 2000. As a result, the acquisition unit 2020 acquires facility specification information and date and time specification information.

Herein, before a user performs selection of a departure facility, the input area 42 may be in a blank state, or may be in a state where a default departure facility is selected. A default departure facility may be common to all users, or may differ for each user. In the former case, for example, a default departure facility is manually set by a manager of the required time prediction apparatus 2000, or determined from a utilization history of the required time prediction apparatus 2000 (e.g., a facility most selected as a departure facility or the like). When a default departure facility is set for each user, for example, a default departure facility is determined by a history of utilization of the required time prediction apparatus 2000 by the same user (e.g., a facility most recently selected as a departure facility, a facility most selected as a departure facility so far, or the like).

Similarly, before a user performs selection of a destination facility, the input area 44 may be in a blank state, or may be in a state where a default destination facility is selected. A method of determining a default destination facility is similar to a method of determining a default departure facility.

Note that, when a boarding gate is specified as a destination facility, allowing an identification number of a boarding gate utilized by a user to be determined enables to more accurately predict a required time. Accordingly, when a boarding gate is selected in the input area 44, information enabling to determine a boarding gate may be allowed to be further input. In this instance, an identification number of a boarding gate may be allowed to be directly input, or another piece of information (e.g., a pair of a date and an identification number of a boarding flight) enabling to determine the boarding gate may be allowed to be input.

Regarding a date and time as well, default information may be displayed in the input area 46. For example, as described above, in a case of specifying an assumed departure date and time, a current date and time is caused to be automatically input. Moreover, in a case of specifying an assumed arrival date and time, a recommended arrival date and time is caused to be set as a default date and time, based on, for example, a departure date and time of a flight to be utilized by a user. In this case, information (e.g., a pair of a date and an identification number of a boarding flight) enabling to determine the departure date and time of the flight to be utilized by a user is allowed to be specified in the input screen 40.

Methods of providing the input screen 40 to a user are varied. For example, a website serving as an interface for utilizing the required time prediction apparatus 2000 is provided to a terminal (user terminal) to be utilized by a user. In this case, by accessing the website from a browser of the user terminal, a web page representing the input screen 40 is provided to the user terminal. When the execution button 48 is pressed, a request including facility specification information and date and time specification information is transmitted from the user terminal to a web server. Note that, a web server providing a website may be achieved by the required time prediction apparatus 2000, or may be achieved by an apparatus other than the required time prediction apparatus 2000. In the latter case, the web server provides, to the required time prediction apparatus 2000, facility specification information and date and time specification information acquired from the user terminal.

In another example, a dedicated application for utilizing the required time prediction apparatus 2000 may be installed on a user terminal. In this case, for example, the input screen 40 is generated by the application. When the execution button 48 is pressed, facility specification information is transmitted to the required time prediction apparatus 2000 from the application.

Note that, a user terminal may be a terminal (e.g., a portable terminal or a PC) owned by a user, or may be a terminal installed at a utilization airport. In the latter case, a facility where the user terminal is installed may be set as a default departure facility in the input screen 40. For example, a departure lobby is set as a default departure facility in a user terminal installed in the departure lobby, and a check-in counter is set as a default departure facility in a user terminal installed in the check-in counter. Moreover, the required time prediction apparatus 2000 may be achieved by a user terminal.

<Specification of Transit Point>

During traveling from a departure facility to a destination facility, a facility that does not need to be utilized may be desired to be transited. As such a facility, for example, a restaurant, a store, or the like is conceivable. Accordingly, a transit point may be allowed to be further specified in the input screen 40.

For example, a transit point is specified by identification information, such as a store name, by which a facility can be uniquely determined. In another example, a transit point may be specified by a combination of a kind of facility and an area where the facility is provided. As a kind of facility, for example, a store, a restaurant, or the like can be cited. As an area where the facility is provided, it is conceivable to specify, for example, such an area as an area before passage of a security check point, or an area (so-called a security area) after passage of a security check point.

<Determination of each Facility to be Utilized>

There is a possibility that one or more facilities exist between a departure facility and a destination facility. For example, when a departure facility is a departure lobby, and a destination facility is a boarding gate, there are a check-in counter, a security check point, and the like between the departure facility and the destination facility. Accordingly, the computation unit 2040 determines each facility to be utilized by a user, and an order thereof, based on a departure facility and a destination facility determined by facility specification information. For example, information lining up, in order, a series of facilities that can be utilized by a user is previously stored in a storage apparatus being accessible from the computation unit 2040. The computation unit 2040 can determine a facility to be utilized, and a utilization order thereof, by extracting, from a series of facilities indicated in the information, a part from a departure facility to a destination facility. Note that, when a transit point is specified, the computation unit 2040 further inserts the transit point into a series of facilities extracted as described above.

<Computation of Waiting Time: S104>

The computation unit 2040 computes, for each facility to be utilized between a departure facility and a destination facility, a waiting time thereof (S104). For example, the computation unit 2040 estimates a waiting time of each facility at an assumed date and time, based on history data indicating a past record of a waiting time of each facility. The history data indicate a record of a waiting time of a facility at a date and time, in association with a pair of the facility and the date and time. The history data are previously stored in a storage apparatus (hereinafter, a history storage apparatus) being accessible from the computation unit 2040. For example, regarding a facility for which a waiting time is desired to be computed, the computation unit 2040 acquires history data of each past date and time in which a waiting time is expected to be similar to that at an assumed date and time, and computes, as a waiting time of the facility at the assumed date and time, a statistical value (an average value or the like) of a waiting time indicated by the acquired history data.

For example, history data in which a day of a week and a time are the same as a day of a week and a time at an assumed date and time can be utilized as history data of a past date and time in which a waiting time is expected to be similar to a waiting time at an assumed date and time. In this case, the computation unit 2040 acquires, from the history storage apparatus, each piece of history data in which a day of a week and a time are the same as a day of a week and a time at an assumed date and time. Then, the computation unit 2040 computes, as an estimated value of a waiting time at the assumed date and time, a statistical value of a waiting time indicated by each piece of the acquired history data. Note that, history data acquired herein may be all pieces of history data in which a day of a week and a time are the same as a day of a week and a time at an assumed date and time, or may be limited to some pieces of such history data (history data within a predetermined period from an assumed date and time, or the like).

Additionally, for example, the computation unit 2040 may acquire history data in which a day of a week and a time are similar to a day of a week and a time at an assumed date and time, in addition to or instead of history data in which a day of a week and a time are the same as a day of a week and a time at an assumed date and time, and determine, as an estimated value of a waiting time at the assumed date and time, a statistical value of a waiting time indicated by each piece of the acquired history data. Similarity of a day of a week is determined by, for example, whether the day of the week is a weekday. In other words, history data being similar to an assumed date and time in relation to a day of a week are history data of a weekday when the assumed date and time is a weekday, and are history data of a day of a week other than a weekday when the assumed date and time is a day of a week other than a weekday. Similarity of a time is determined by, for example, a difference between a time of an assumed date and time and a time. Specifically, history data in which a difference between a time of an assumed date and time and a time is equal to or less than a predetermined value (e.g., equal to or less than 30 minutes) are used as history data being similar to an assumed date and time in relation to a time.

In another example, each of a plurality of pairs of dates and time periods is ranked based on a congestion degree of a utilization airport, and a waiting time may be estimated by utilizing history data categorized into the same rank as an assumed date and time. Information associating a rank of a congestion degree with a pair of a date and a time period is previously stored in a storage apparatus being accessible from the computation unit 2040. A pair of a past date and a time period can be ranked based on a record of a congestion degree. On the other hand, a pair of a future date and a time period is ranked based on a statistical prediction or the like.

The computation unit 2040 determines a rank of an assumed date and time by accessing a storage apparatus storing information of a rank. The computation unit 2040 determines one or more pairs of past dates and time periods categorized in the same rank as an assumed date and time, by accessing the storage apparatus. The computation unit 2040 acquires history data of each of the determined pairs of dates and time periods, regarding a facility for which a waiting time is desired to be computed. The computation unit 2040 computes a statistical value of a waiting time indicated by the acquired history data, as an estimated value of a waiting time of the facility.

In another example, an estimator that estimates, for each facility, a waiting time of the facility may be prepared. For example, an estimator is configured in such a way as to output an estimated value of a waiting time in response to input of an assumed date and time. In this case, the computation unit 2040 can input an assumed date and time to an estimator of a facility for which a waiting time is desired to be computed, and thereby acquire an estimated value of a waiting time from the estimator.

The estimator previously learns by use of the history data (a pair of a date and time and a waiting time) as training data. Note that, it is preferred that the estimator further acquires not only a date and time but also an attribute (a day of a week or the like) of the date and time, and utilizes for estimation of a waiting time. An attribute of a date and time may be given to the estimator as input, or may be automatically acquired by the estimator.

A method of computing a waiting time at an assumed date and time is not limited to a method that utilizes a history of a waiting time. For example, a history of a length (the number of persons included in a queue) of a queue of a facility may be recorded as history data in association with a date and time. In this case, for example, regarding a facility for which a waiting time is desired to be computed, the computation unit 2040 acquires history data in which a day of a week and a time are the same as a day of a week and a time at an assumed date and time, or acquires history data in which a day of a week and a time are similar to a day of a week and a time at an assumed date and time. Further, the computation unit 2040 computes a statistical value of a length of a queue of a facility indicated by the acquired history data, as an estimated value of a length of a queue of the facility at an assumed date and time. Then, the computation unit 2040 computes an estimated value of a waiting time of the facility, based on the estimated value of the length of the queue, and a throughput (the number of persons who can pass through the facility per unit time) of the facility. Note that, an existing technique can be utilized as a technique for computing a waiting time, based on a length of a queue and a throughput.

Moreover, an estimator that estimates a length of a queue may be provided by a method similar to the above-described method of providing an estimator that estimates a waiting time. In this case, the computation unit 2040 acquires an estimated value of a length of a queue by inputting an assumed date and time to the estimator, and estimates a waiting time, based on the estimated value and a throughput of a facility.

History data may not be used for estimation of a waiting time. For example, the computation unit 2040 estimates a length of a queue of a facility at an assumed date and time, based on a flight schedule at the assumed date and time. Then, the computation unit 2040 computes an estimated value of a waiting time of a facility, based on an estimated value of a length of a queue, and a throughput of the facility.

A method of estimating, based on a flight schedule, a length of a queue of a facility is any method. For example, a length of a queue of a facility is estimated based on the number of accommodatable persons or the like of each flight indicated in the flight schedule. For example, it is assumed that a person who boards a flight departing at a certain date and time dispersedly utilizes each facility in a period (e.g., a period from one hour and a half to 30 minutes before a departure date and time) being in a predetermined relation with the departure date and time. As a more specific example, it can be assumed that, when the number of accommodatable persons of a certain flight is 300, 50 persons utilize each facility every 10 minutes, within one hour being from one hour and a half to 30 minutes before a departure date and time of the flight. The computation unit 2040 allocates, based on such an assumption, the number of accommodatable persons of each flight indicated by a flight schedule on a day being relevant to an assumed date and time to each time period such as every ten minutes. The number of persons who utilize a certain facility in a certain time period can be estimated as a sum value of persons who are allocated to the facility in the time period and board each flight. Then, for example, by assuming that a length of a queue of the facility in the time period is equal to the number of persons who utilize the facility in the time period, a length of a queue of the facility can be estimated.

Note that, in the assumption described above, the number of accommodatable persons of each flight is equally divided into each time period such as every ten minutes. However, a method of dividing the number of accommodatable persons into a plurality of time periods is not limited to equal division. For example, a distribution of a time period in which a person who boards utilizes a facility may be previously computed by use of statistical technique or the like, and a person who boards each flight may be allocated to each time period according to the distribution.

<Computation of required time: S106>

The computation unit 2040 computes a predicted required time, based on an estimated waiting time of a facility. Herein, a required time from a departure facility to a destination facility includes a travel time between facilities, and a utilization time of each facility, in addition to a waiting time of each facility. Accordingly, for example, the computation unit 2040 computes, as a predicted required time, a value summing up a waiting time of each facility, a travel time between facilities, and a utilization time of each facility. A method of computing a travel time and a utilization time is described below.

<<Computation of travel time>>

The computation unit 2040 computes a travel time between facilities utilized from departure from a departure facility to arrival at a destination facility. For example, information indicating a travel time between facilities is previously stored in a storage apparatus being accessible from the computation unit 2040. The information is represented by, for example, association "pair of facilities, and a time required for traveling between the facilities". Regarding each of facilities utilized from departure from a departure facility to arrival at a destination facility, the computation unit 2040 acquires, from the above-described storage apparatus for each pair of adjacent facilities in a utilization order, a travel time between the facilities.

Herein, a time required for traveling between the facilities is changeable depending on an attribute of a user. For example, a child or an elderly person is considered to become longer in travel time as compared with a young adult person. Accordingly, for example, the computation unit 2040 acquires information indicating an attribute of a user, and makes a correction on a travel time acquired from the storage apparatus, according to the attribute. For example, information associating a correction coefficient with each of a plurality of age groups (numerical ranges of ages) is previously stored in a storage apparatus being accessible from the computation unit 2040. The computation unit 2040 acquires a correction coefficient being related to an attribute of a user, applies (e.g., multiplies) the correction coefficient to the travel time between the facilities acquired from the storage apparatus, and thereby computes a travel time between the facilities.

Note that, an attribute of a user may be previously registered as information relating to the user, or may be input by a user terminal.

Information to be previously stored in a storage apparatus may be information indicating a distance between facilities. In this case, regarding each of facilities utilized from departure from a departure facility to arrival at a destination facility, the computation unit 2040 acquires a distance between the facilities from the above-described storage apparatus, for each pair of adjacent facilities in a utilization order. Then, the computation unit 2040 computes, for each pair of facilities, a travel time between the facilities, based on a distance between the facilities. For example, a statistical value (e.g., an average value or the like) of a travel velocity of a person within a utilization airport is previously stored in a storage apparatus being accessible from the computation unit 2040. The computation unit 2040 divides a distance between facilities by a statistical value of a travel velocity, and thereby computes a travel time between the facilities. Note that, the above-described correction based on an attribute of a user may be made on a travel velocity.

<<Computation of utilization time>>

Regarding each of facilities utilized from departure from a departure facility to arrival at a destination facility, the computation unit 2040 determines a utilization time of the facility. For example, information indicating, for each facility, a utilization time of the facility is previously stored in a storage apparatus being accessible from the computation unit 2040. Regarding each of facilities utilized from a departure facility to a destination facility, the computation unit 2040 acquires the utilization time from the above-described storage apparatus, and thereby determines a utilization time of each facility.

However, a utilization time of a facility is changeable depending on an attribute of a user or a utilization aspect of a facility. For example, a utilization time of a check-in counter is changeable depending on the number of pieces of baggage to be checked. Moreover, a time required for utilization of a security check point is changeable depending on the number of persons with whom a user acts together. For example, when a user utilizes a utilization airport with a family, a utilization time of a security check point becomes a time required for check of the user and all members of the family. Thus, as compared with a case where a user utilizes a utilization airport alone, a utilization time of a security check point becomes long. Additionally, for example, a utilization time of a passport control area is changeable depending on a nationality of a user or the like. For example, when a utilization airport is an airport in Japan, a time required for passport check is changeable depending on whether a user is Japanese.

Accordingly, the computation unit 2040 may acquire information indicating an attribute of a user or a utilization aspect of a facility, and make a correction on a utilization time of a facility, based on the acquired information. For example, for each facility, a correction method according to an attribute or a utilization aspect influencing a utilization time of the facility is determined. The computation unit 2040 performs correction on a utilization time of a facility acquired from the storage apparatus, by a correction method according to an attribute of a user or a utilization aspect of a facility.

For example, in the example described above, such information as "influencing utilization aspect: the number of pieces of baggage to be checked, correction method: application of a correction function with the number of pieces of baggage as input" is previously prepared regarding a check-in counter. The correction function is a monotone nondecreasing function that becomes greater in a value of output as an input value (the number of pieces of baggage) is great. The computation unit 2040 inputs, to the correction function, the number of pieces of baggage that a user checks at a check-in counter, multiplies a value (i.e., correction coefficient) output from the correction function by a utilization time of a facility, and thereby corrects the utilization time of the facility.

Note that, an acquisition method of an attribute of a user is as described above. A utilization aspect of a facility is allowed to be input in the input screen 40 with, for example, a departure facility or the like.

<Output of result>

Figure 6:
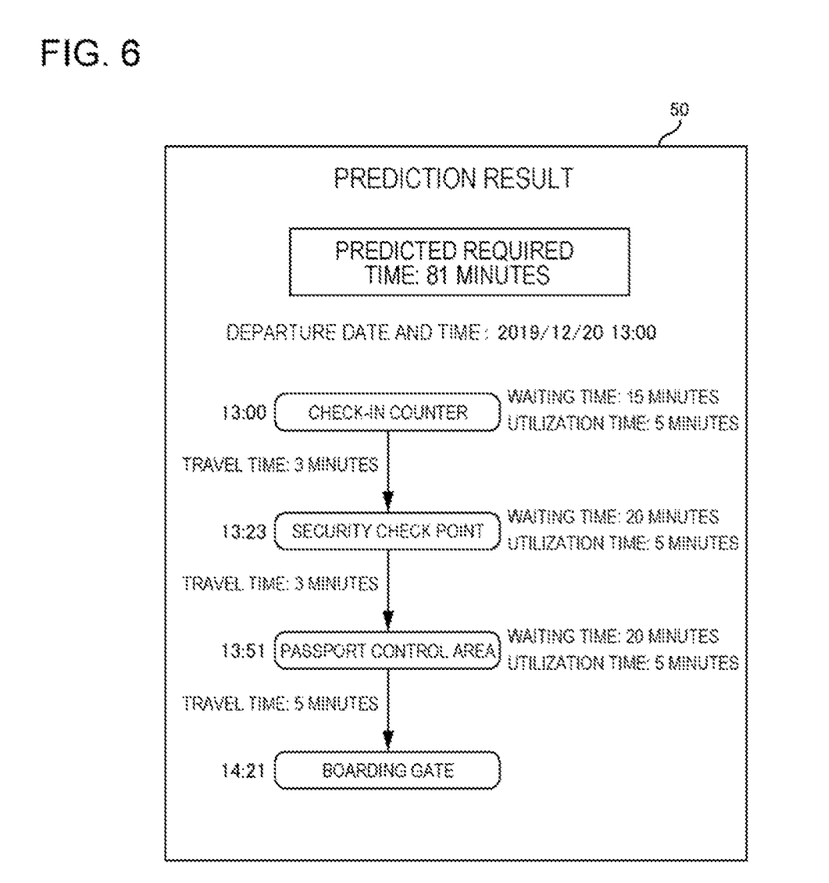
FIG. 6 is a diagram illustrating output information displayed on a display apparatus.

The computation unit 2040 outputs output information indicating a computed required time or the like. For example, output information is displayed on a display apparatus of a user terminal. FIG. 6 is a diagram illustrating output information displayed on a display apparatus. FIG. 6 is an example of a case where a check-in counter, a boarding gate, and 2019 Dec. 20 13:00 are specified as a departure facility, a destination facility, and an assumed departure date and time, respectively. A waiting time and a utilization time regarding each facility from a departure facility to a destination facility, a travel time between facilities, and a predicted required time summing up the times are indicated on an output screen 50.

Moreover, since a scheduled arrival time is also displayed beside each facility in the output screen 50, a user can recognize a scheduled time of arriving at a destination facility. Note that, when a scheduled arrival time is specified as an assumed date and time, a user can recognize a time to depart from a departure facility (in other words, a time to arrive at a departure facility), by looking at a time displayed beside a departure facility.

Note that, the required time prediction apparatus 2000 may automatically compute a predicted required time, not only regarding one assumed date and time determined by assumed date and time information (specified by a user), but also regarding a case assuming departure or arrival at a date and time a predetermined time away from the assumed date and time. For example, the required time prediction apparatus 2000 computes and outputs a predicted required time with, as an assumed departure date and time, three dates and times being an assumed departure date and time specified by a user, one hour before the assumed departure date and time, and one hour after the assumed departure date and time. Thereby, a user can easily compare a predicted required time assuming departure or arrival at a date and time specified by the user, and a predicted required time assuming departure or arrival before and after the specified date and time.

<Modified Example>

In the example embodiment described above, an assumed departure date and time or an assumed arrival date and time is specified by a user. However, the required time prediction apparatus 2000 may acquire information enabling to determine a departure date and time of a flight to be utilized by a user, instead. The required time prediction apparatus 2000 that acquires such information and operates is referred to as the required time prediction apparatus 2000 according to a modified example.

The required time prediction apparatus 2000 according to the modified example sets, as an assumed arrival date and time, one or more dates and times being in time for departure of a flight to be utilized, and computes a predicted required time. For example, it is assumed that a departure date and time of a boarding flight to be utilized by a user is 3 p.m. on 2019 Dec. 20. Further, it is assumed that a specified destination facility is a boarding gate. Then, it is assumed that a utilization airport determines that the boarding gate has to be arrived 30 minutes before a departure time. In this case, for example, the required time prediction apparatus 2000 sets, to an assumed arrival date and time, 2:30 p.m. on 2019 Dec. 20 being 30 minutes before a departure date and time of a boarding flight, and computes a predicted required time. By looking at a result of such prediction, a user can recognize by when the user has to arrive at a departure facility at latest in order to get on a flight that the user desires to utilize. Note that, a facility to be specified as a destination facility is not limited to a boarding gate, and any other facility (e.g., a security check point) enabling to determine a time to pass through the facility in relation to a departure date and time of a boarding flight can be a destination facility.

The required time prediction apparatus 2000 may compute a predicted required time regarding, in addition to a case where an assumed arrival date and time is a date and time when a user has to arrive at a destination facility, a case where an assumed arrival date and time is a date and time predetermined time before the date and time of the former case. For example, the required time prediction apparatus 2000 computes a predicted required time regarding each of four patterns in which assumed arrival dates and times are a date and time when a user has to arrive at a destination facility, 30 minutes before the date and time, one hour before the date and time, and one hour and a half before the date and time, and provides the computed predicted required time to a user terminal. A user can compare predictions regarding such a plurality of patterns, and select a schedule preferable for the user.

For example, it is assumed that there is a user who desires to pass through each facility as smoothly as possible even though a time of arriving a boarding gate becomes early. In this case, it is assumed that a required time is predicted to be 90 minutes when an assumed arrival date and time is a date and time on which a destination facility has to be arrived at, whereas a required time is predicted to be 40 minutes when an assumed arrival date and time is one hour before a date and time on which a destination facility has to be arrived at. In this case, a user can recognize and select a schedule suited to his/her preference in which the user can smoothly pass through each facility instead of arriving at a boarding gate one hour early.

Herein, various kinds of pieces of information can be utilized as a piece of information enabling to determine a departure date and time of a flight to be utilized by a user. For example, as such information, a departure date and time itself, a pair of a date and time and identification information of a boarding flight, or the like can be utilized.

Some or all of the above-described example embodiments can also be described as, but are not limited to, the following supplementary notes.

1. A required time prediction apparatus including:
   an acquisition unit that acquires utilization facility information enabling to determine a departure facility in or near an airport and a destination facility in the airport, and assumed date and time information enabling to determine an assumed departure date and time assuming departure from the departure facility or an assumed arrival date and time assuming arrival at the destination facility; and
   a computation unit that estimates a waiting time at each facility being present between the departure facility and the destination facility, regarding a case of assuming departure from the departure facility at the assumed departure date and time, or a case of assuming arrival at the destination facility at the assumed arrival date and time, and computes, based on the estimated waiting time, a predicted required time from departure from the departure facility to arrival at the destination facility.

2. The required time prediction apparatus according to supplementary note 1, wherein
   the computation unit computes, as the predicted required time, a value summing up a predicted value of a waiting time at each facility being present between the departure facility and the destination facility, a predicted value of a utilization time at each facility being present between the departure facility and the destination facility, and a predicted value of a travel time between facilities being present between the departure facility and the destination facility.

3. The required time prediction apparatus according to supplementary note 1, wherein,
regarding each of facilities from the departure facility to the destination facility, the computation unit
  acquires history data being related to the assumed departure date and time or the assumed arrival date and time, from among pieces of history data each indicating a past waiting time or a past length of a queue regarding the facility, and
  estimates, by use of the acquired history data, a waiting time of the facility, at the assumed departure date and time or the assumed arrival date and time.

4. The required time prediction apparatus according to supplementary note 3, wherein
the computation unit acquires, as the history data being related to the assumed departure date and time or the assumed arrival date and time, the history data of a date and time in which a pair of a day of a week and a time is coincident with or similar to a pair of a day of a week and a time at the assumed departure date and time or the assumed arrival date and time.

5. The required time prediction apparatus according to supplementary note 3, wherein
a rank according to a congestion degree is associated with each date and time, and
the computation unit acquires, as the history data being related to the assumed departure date and time or the assumed arrival date and time, the history data of a date and time in which the rank is coincident with the rank of the assumed departure date and time or the assumed arrival date and time.

6. The required time prediction apparatus according to any one of supplementary notes 1 to 5, wherein
the assumed date and time information is information enabling to determine the assumed arrival date and time, and
the computation unit computes, based on the assumed arrival date and time and the computed predicted required time, a date and time to depart from the departure facility.

7. The required time prediction apparatus according to any one of supplementary notes 1 to 6, wherein
the acquisition unit acquires information relating to a transit facility being transited in a travel from the departure facility up to the destination facility, and
the computation unit computes the predicted required time regarding a case of traveling from the departure facility to the destination facility by transiting the transit facility.

8. A control method including:
an acquisition step of acquiring utilization facility information enabling to determine a departure facility in or near an airport and a destination facility in the airport, and assumed date and time information enabling to determine an assumed departure date and time assuming departure from the departure facility or an assumed arrival date and time assuming arrival at the destination facility; and
a computation step of estimating a waiting time at each facility being present between the departure facility and the destination facility, regarding a case of assuming departure from the departure facility at the assumed departure date and time, or a case of assuming arrival at the destination facility at the assumed arrival date and time, and computing, based on the estimated waiting time, a predicted required time from departure from the departure facility to arrival at the destination facility.

9. The control method according to supplementary note 8, further including,
in the computation step, computing, as the predicted required time, a value summing up a predicted value of a waiting time at each facility being present between the departure facility and the destination facility, a predicted value of a utilization time at each facility being present between the departure facility and the destination facility, and a predicted value of a travel time between facilities being present between the departure facility and the destination facility.

10. The control method according to supplementary note 8, further including:
in the computation step, regarding each of facilities from the departure facility to the destination facility,
  acquiring history data being related to the assumed departure date and time or the assumed arrival date and time, from among pieces of history data each indicating a past waiting time or a past length of a queue regarding the facility; and
  estimating, by use of the acquired history data, a waiting time of the facility, at the assumed departure date and time or the assumed arrival date and time.

11. The control method according to supplementary note 10, further including,
in the computation step, acquiring, as the history data being related to the assumed departure date and time or the assumed arrival date and time, the history data of a date and time in which a pair of a day of a week and a time is coincident with or similar to a pair of a day of a week and a time at the assumed departure date and time or the assumed arrival date and time.

12. The control method according to supplementary note 10, wherein
a rank according to a congestion degree is associated with each date and time,
the control method further including,
in the computation step, acquiring, as the history data being related to the assumed departure date and time or the assumed arrival date and time, the history data of a date and time in which the rank is coincident with the rank of the assumed departure date and time or the assumed arrival date and time.

13. The control method according to any one of supplementary notes 8 to 12, wherein
the assumed date and time information is information enabling to determine the assumed arrival date and time,
the control method further including,
in the computation step, computing, based on the assumed arrival date and time and the computed predicted required time, a date and time to depart from the departure facility.

14. The control method according to any one of supplementary notes 8 to 13, further including:
in the acquisition step, acquiring information relating to a transit facility being transited in a travel from the departure facility up to the destination facility; and
in the computation step, computing the predicted required time regarding a case of traveling from the departure facility to the destination facility by transiting the transit facility.

15. A program causing a computer to execute the control method according to any one of supplementary notes 8 to 14.

REFERENCE SIGNS LIST

30 Terminal
40 Input screen
42 Input area
44 Input area
46 Input area
48 Execution button
50 Input area
52 Input area
1000 Computer
1020 Bus
1040 Processor
1060 Memory
1080 Storage device
1100 Input/output interface
1120 Network interface
2000 Required time prediction apparatus
2020 Acquisition unit
2040 Computation unit

What is claimed is:

1. A required time prediction apparatus comprising:
at least one memory configured to store instructions; and
at least one processor configured to execute the instructions to perform operations comprising:
acquiring utilization facility information to determine a departure facility in or near an airport and a destination facility within the airport, and assumed date and time information to determine an assumed departure date and time for departure from the departure facility or an assumed arrival date and time for arrival at the destination facility;
estimating a waiting time at each facility among one or more facilities being present between the departure facility and the destination facility, based on departure from the departure facility at the assumed departure date and time, or based on arrival at the destination facility at the assumed arrival date and time; and
computing, based on the estimated waiting time, a predicted required time from departure from the departure facility to arrival at the destination facility,
wherein estimating the waiting time comprises, for each facility of the one or more facilities from the departure facility to the destination facility:
acquiring history data being related to the assumed departure date and time or the assumed arrival date and time, from among pieces of history data each indicating a past waiting time or a past length of a queue for a respective facility; and
estimating, by use of the acquired history data, a waiting time of the respective facility, at the assumed departure date and time or the assumed arrival date and time; and
wherein:
a rank according to a congestion degree is associated with each date and time, and
acquiring history data further comprises acquiring, as the history data being related to the assumed departure date and time or the assumed arrival date and time, the history data of a date and time in which the rank is coincident with the rank of the assumed departure date and time or the assumed arrival date and time.

2. The required time prediction apparatus according to claim 1, wherein the assumed date and time information is information enabling to determine the assumed arrival date and time, and
the operations further comprise computing, based on the assumed arrival date and time and the computed predicted required time, a date and time to depart from the departure facility.

3. The required time prediction apparatus according to claim 1, wherein
the operations further comprise acquiring information relating to a transit facility being transited in a travel from the departure facility up to the destination facility, and
computing a predicted required time comprises computing the predicted required time regarding a case of traveling from the departure facility to the destination facility by transiting the transit facility.

4. The required time prediction apparatus according to claim 1, wherein the apparatus is configured as an airport facility navigation apparatus the further comprises at least one interactive display interface, wherein the at least one processor is further configured to execute the instructions to output on the at least one interactive display interface a graphical representation of the predicted required time from departure from the departure facility to arrival at the destination facility, the graphical representation comprises statistical values summing up a waiting time of each facility among the one or more facilities being present between the departure facility and the destination facility, a travel time between each facility, and an estimated utilization time of each facility.

5. A control method executed by a computer comprising:
acquiring utilization facility information to determine a departure facility in or near an airport and a destination facility within the airport, and assumed date and time information to determine an assumed departure date and time for departure from the departure facility or an assumed arrival date and time for arrival at the destination facility;
estimating a waiting time at each facility among one or more facilities being present between the departure facility and the destination facility, based on departure from the departure facility at the assumed departure date and time, or based on arrival at the destination facility at the assumed arrival date and time; and
computing, based on the estimated waiting time, a predicted required time from departure from the departure facility to arrival at the destination facility,
wherein estimating the waiting time comprises, for each facility of the one or more facilities from the departure facility to the destination facility:
acquiring history data being related to the assumed departure date and time or the assumed arrival date and time, from among pieces of history data each indicating a past waiting time or a past length of a queue for a respective facility; and
estimating, by use of the acquired history data, a waiting time of the respective facility, at the assumed departure date and time or the assumed arrival date and time; and
wherein:
a rank according to a congestion degree is associated with each date and time, and
acquiring history data further comprises acquiring, as the history data being related to the assumed departure date and time or the assumed arrival date and time, the history data of a date and time in which the rank is coincident with the rank of the assumed departure date and time or the assumed arrival date and time.

6. The control method according to claim 5, wherein the assumed date and time information is information enabling to determine the assumed arrival date and time, and the control method further comprises, computing, based on the assumed arrival date and time and the computed predicted required time, a date and time to depart from the departure facility.

7. The control method according to claim 5, further comprising acquiring information relating to a transit facility being transited in a travel from the departure facility up to the destination facility;

wherein computing a predicted required time comprises computing the predicted required time regarding a case of traveling from the departure facility to the destination facility by transiting the transit facility.

8. The control method according to claim 5, wherein the control method facilitates navigating airport facilities and further comprises outputting on at least one interactive display interface a graphical representation of the predicted required time from departure from the departure facility to arrival at the destination facility, the graphical representation comprises statistical values summing up a waiting time of each facility among the one or more facilities being present between the departure facility and the destination facility, a travel time between each facility, and an estimated utilization time of each facility.

9. A non-transitory storage medium storing a program causing a computer to execute a control method, the control method comprising:

acquiring utilization facility information to determine a departure facility in or near an airport and a destination facility within the airport, and assumed date and time information to determine an assumed departure date and time for departure from the departure facility or an assumed arrival date and time for arrival at the destination facility;

estimating a waiting time at each facility among the one or more facilities being present between the departure facility and the destination facility, based on departure from the departure facility at the assumed departure date and time, or based on arrival at the destination facility at the assumed arrival date and time; and computing, based on the estimated waiting time, a predicted required time from departure from the departure facility to arrival at the destination facility, wherein estimating the waiting time comprises, for each facility of the one or more facilities from the departure facility to the destination facility:

acquiring history data being related to the assumed departure date and time or the assumed arrival date and time, from among pieces of history data each indicating a past waiting time or a past length of a queue for a respective facility; and estimating, by use of the acquired history data, a waiting time of the respective facility, at the assumed departure date and time or the assumed arrival date and time; and wherein:

a rank according to a congestion degree is associated with each date and time, and acquiring history data further comprises acquiring, as the history data being related to the assumed departure date and time or the assumed arrival date and time, the history data of a date and time in which the rank is coincident with the rank of the assumed departure date and time or the assumed arrival date and time.

10. The non-transitory storage medium according to claim 9, wherein the assumed date and time information is information enabling to determine the assumed arrival date and time, and the control method further comprises, computing, based on the assumed arrival date and time and the computed predicted required time, a date and time to depart from the departure facility.

11. The non-transitory storage medium according to claim 9, wherein the control method facilitates navigating airport facilities and further comprises outputting on at least one interactive display interface a graphical representation of the predicted required time from departure from the departure facility to arrival at the destination facility, the graphical representation comprises statistical values summing up a waiting time of each facility among the one or more facilities being present between the departure facility and the destination facility, a travel time between each facility, and an estimated utilization time of each facility.

* * * * *